US006330073B1

(12) United States Patent
Sciatto

(10) Patent No.: US 6,330,073 B1
(45) Date of Patent: Dec. 11, 2001

(54) SYSTEM AND METHOD FOR MERGING MULTI-PLATFORM DOCUMENTS

(75) Inventor: Brian Sciatto, Commerce Township, MI (US)

(73) Assignee: NW Coughlin, Plymouth, MI (US)

( * ) Notice: Subject to any disclaimer, the term of this patent is extended or adjusted under 35 U.S.C. 154(b) by 0 days.

(21) Appl. No.: 09/119,156

(22) Filed: Jul. 20, 1998

(51) Int. Cl.[7] .............................. B41B 15/00; B41J 15/00; G06K 9/00
(52) U.S. Cl. ....................... 358/1.18; 358/1.16; 358/1.17; 382/137; 382/138; 382/139
(58) Field of Search .................................. 358/1.17, 1.16, 358/1.18; 382/305, 137, 138, 139, 140, 311; 364/900; 707/506, 507, 508

(56) References Cited

U.S. PATENT DOCUMENTS

| | | | |
|---|---|---|---|
| 4,649,513 | * | 3/1987 | Martin et al. ......................... 364/900 |
| 5,917,965 | * | 6/1999 | Cahill et al. ........................... 382/305 |
| 6,014,629 | * | 1/2000 | DeBruin-Ashton ...................... 705/2 |

* cited by examiner

Primary Examiner—Edward Coles
Assistant Examiner—Twyler Lamb
(74) Attorney, Agent, or Firm—Brooks & Kushman PC

(57) ABSTRACT

A system and method for generating a plurality of customized documents having at least one portion of common information and at least one portion of variable information where the common information is generated using a first computing platform and the variable information is generated using a second computing platform include generating and storing data representing an electronic image of the common information, generating a mail merge file using the second computing platform to position variables representing the variable information within a page, electronically combining the image of the common information with the mail merge file generated using the second computing platform by overlaying the common information and variable information based on position of the variables within the page for each of the plurality of customized documents, and printing each of the customized documents. The system and method provide for mail merging of disparate documents without significant manual manipulation often necessitated by conversion of documents between different platforms.

18 Claims, 2 Drawing Sheets

SYSTEM AND METHOD FOR MERGING MULTI-PLATFORM DOCUMENTS

TECHNICAL FIELD

The present invention relates to a system and method for creating customized documents by merging documents created by disparate or otherwise incompatible computing platforms.

BACKGROUND ART

A wide variety of special-purpose and general-purpose computing platforms, including hardware and software, has been developed to address a myriad of diverse applications. Unfortunately, more often than not, a particular platform is incompatible with all other platforms. Considerable time and effort is required to automatically translate or convert data and applications from one platform to another to provide interoperability, which is typically marginal at best. Even after most automatic conversions, manual manipulation is invariably required to produce a similar or identical result. As such, the benefits of using a particular hardware or software platform or application are often lost when the application or data are converted to another platform or format. Thus, it is desirable to utilize a single platform when possible, or to provide a method of converting data which preserves its native properties and does not require significant manual manipulation.

Applications historically plagued by incompatibilities between operating platforms include, among others, direct mail marketing and/or focused or targeted advertising. Microcomputers in combination with high-speed printing machines can be used to generate customized documents which include variable data based on the recipient, or any of a number of other criteria. Typically, an advertising, marketing, or graphic design agency creates a letter, brochure, catalog, or other literature which is merged with an appropriate database to generate the customized documents. However, the computing platform used to generate the graphic or letter is often incompatible with the computing platform used for the variable information. This requires conversion between platforms resulting in significant manual manipulation and an additional approval cycle which adds cost and delays delivery of the final product. For example, a form document may be generated using a Macintosh computer which is preferred for its graphic design capabilities and associated application software while the variable data is collected using a mainframe computer and placed in a standard data interchange file. The preferred mail merging software runs only on a PC which requires conversion of the Macintosh graphic design document for merging with the variable data contained in the data interchange file. Once converted, the graphic design must be manually manipulated through a trial and error process. Typefaces, font sizes, graphic placement, etc. must be iteratively adjusted to recreate a similar looking document which must then be approved by the customer since there are almost always some differences from the originally designed document.

DISCLOSURE OF INVENTION

Thus, it is an object of the present invention to provide a system and method for merging documents created on different computing platforms while reducing or eliminating manual manipulation.

Another object of the present invention is to provide a system and method for mail merging variable data generated using a first computer operating system with form data generated using a second computer operating system.

A further object of the present invention is to provide a system and method for merging a document created on a first computing platform with data generated on a second computing platform without converting the document to the second computing platform.

Yet another object of the present invention is to provide a system and method for generating customized documents based on multi-platform data which improves fidelity of the customized documents relative to the original form.

In carrying out the above objects and other objects and features of the present invention a method for generating a plurality of customized documents having at least one portion of common information and at least one portion of variable information is provided. The method is particularly useful where the common information is generated using a first computing platform and the variable information is generated using a second computing platform. In one embodiment, the method includes generating and storing data representing an electronic image of the common information and generating a mail merge file using the second computing platform to position variables representing the variable information within a page. The method also includes electronically combining the image of the common information with the mail merge file generated using the second computing platform by overlaying the common information and variable information based on position of the variables within the page for each of the plurality of customized documents, and finally printing each of the customized documents.

The present invention also provides a system for creating customized documents. The system includes a first computer having associated hardware and software defining a first computing platform. The first computer executes stored program instructions to create a first document containing at least one space for receiving variable information. The first document is preferably represented by data in a standard format and includes at least one space for receiving variable information. The system also includes a computer readable storage medium in communication with the first computer, the computer readable storage medium receiving and storing the data representing the first document in a standard image format. A second computer having associated hardware and software defines a second computing platform incompatible with the first computing platform. The second computer executes stored program instructions to create a second document including at least one variable positioned relative to the first document to coincide with the at least one space. The second document has an associated data file which includes data corresponding to each variable. The second computer creates a plurality of electronic documents each having the corresponding data substituted for the at least one variable. A printer in communication with the first and second computers and the computer readable storage medium combines each of the plurality of electronic documents with the standard image format data to merge and print the customized documents.

The present invention provides a number of advantages. More accurate reproduction of a document supplied by a customer reduces turn-around time and costs associated with manually manipulating or recreating a document in the same platform used to insert the variable data.

The above advantages and other advantages, features, and objects of the present invention will be readily appreciated by one of ordinary skill in the art from the following detailed description of the best mode for carrying out the invention when taken in connection with the accompanying drawings.

BEST MODE FOR CARRYING OUT THE INVENTION

As used throughout this description, computing platforms and words or phrases of similar import refer collectively to computer hardware in combination with application and operating system software. Incompatible, disparate, dissimilar, and words of similar import indicate that a particular application program, operating system, and/or computer hardware device is not completely interchangeable with another device or system. Thus, a computing platform is incompatible with another computing platform if documents generated utilizing a particular application program require some type of conversion which produces discernible differences in any particular document ported or converted from one platform to another.

Figure 1:
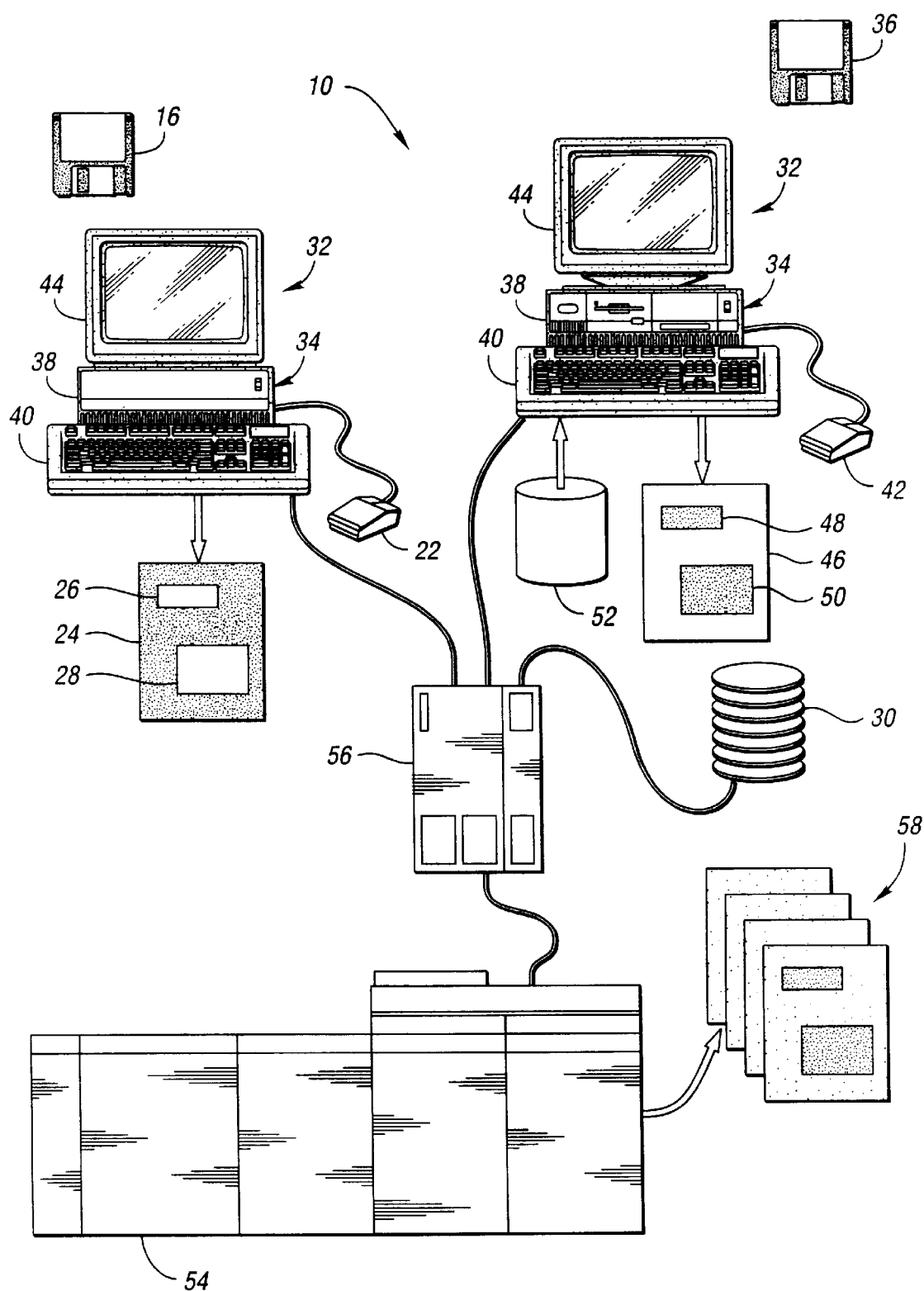
FIG. 1 is a block diagram illustrating one embodiment of a system for merging multi-platform documents according to the present invention.

Referring now to FIG. 1, a block diagram illustrating one embodiment of a system for merging multi-platform documents according to the present invention is shown. System 10 includes a first computer 12 having associated hardware 14 and software 16 defining a first computing platform. Hardware 14 may include a processor 18, keyboard 20, and mouse 22. Of course, hardware 14 may also include various other input, output, storage, and/or processing components not specifically illustrated but well known in the art. The first computer 12 executes stored program instructions to create a first document 24 containing at least one space, indicated generally by boxes 26 and 28. Spaces 26 and 28 are designed to receive variable information which may change from document to document, or from a group of documents to another group of documents, or any combination thereof. Preferably, first document 24 is represented by data in a standard format. The standard format is preferably recognized by one or more standards organizations, committees, or the like. For example, in one embodiment, document 24 is represented by data stored in the tagged image file format (TIFF). Alternatively, the first document may be stored in any standard or proprietary format and later converted as explained in greater detail below. However, the format should be an image format so that the appearance of the document does not change when the format is converted.

System 10 also includes a computer-readable storage medium 30 in communication with the first computer 12. Computer-readable storage medium 30 may be located locally or remotely relative to computer 12. For example, computer-readable storage medium 30 may be accessible via a network and physically co-located with any one of the other devices described below. Computer-readable storage medium 30 receives and stores the data representing first document 24 in a standard image format for subsequent processing. System 10 also includes a second computer 32 having associated hardware 34 and software 36 defining a second computing platform which is incompatible with the first computing platform. Hardware 34 includes a processing unit 38, keyboard 40, mouse 42, and display 44. Second computer 32 executes stored program instructions to create a second document 46 which includes at least one variable, indicated generally by boxes 48 and 50. The variables 48, 50 are positioned relative to first document 24 to coincide with the at least one space 26, 28. Variables 48, 50 have an associated data file, represented generally by database 52 which includes data corresponding to each variable. For example, database 52 may contain names and addresses of recipients in addition to information specific to a particular geographic region. Variables corresponding to the recipient may be positioned using one or more variables 48 while the geographic-specific information may be positioned using one or more variables 50.

Second computer 32 creates a plurality of electronic documents having the corresponding data substituted from database 52 for each of the variables 48, 50 and sends them to a printer 54 which is in communication with the second computer 32, first computer 12, and computer-readable storage medium 30. As illustrated, communication may be facilitated through a network which includes one or more servers 56. Alternatively, a direct connection may be utilized or data may be stored in a separate computer readable storage medium such as a floppy disk, CD-ROM, magnetic tape, or the like. Printer 54 successively combines each of the plurality of electronic documents 46 with the standard image format data to merge and print the customized documents, indicated generally by reference numeral 58. In one embodiment, printer 54 contains computer-readable storage medium 30 and performs conversion of electronic data representing document 24 to a TIFF format data file.

As indicated above, the first and second computing platforms may differ in terms of hardware or software which includes operating system level software and application software. Likewise, incompatible computing platforms may include more than one component which is incompatible with another platform. For example, first computer 12 may include a first processor or microprocessor having an associated first instruction set while second computer 32 includes a second processor or microprocessor having a different instruction set such that one or more of the stored program instructions executed by the processor of first computer 12 are not executable by the processor of second computer 32.

Figure 2:
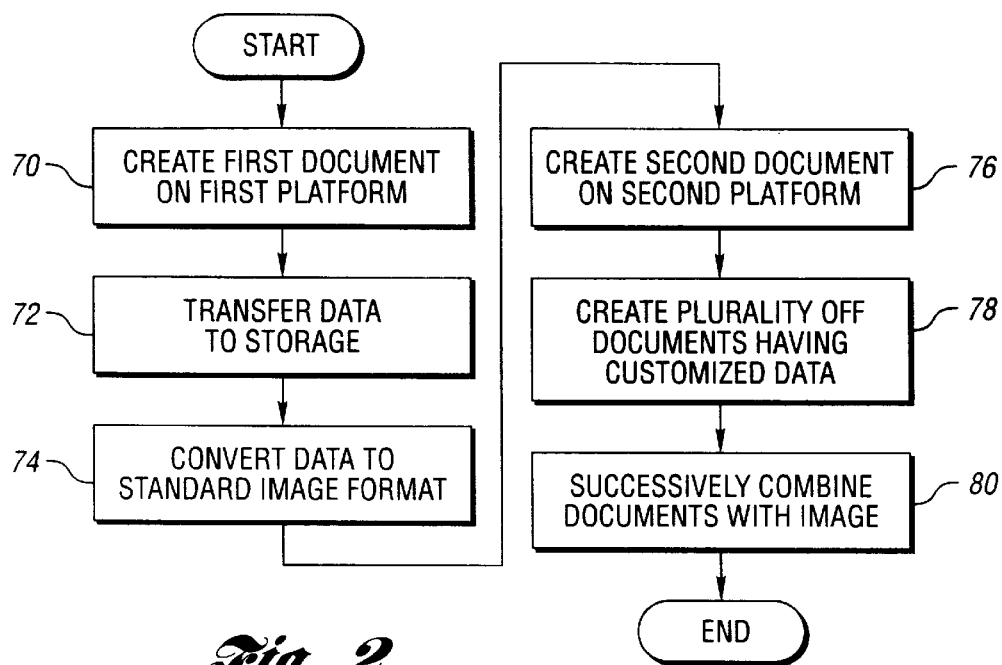
FIG. 2 is a flow chart illustrating one embodiment of a method for merging multi-platform documents according to the present invention.

Referring now to FIG. 2, a flowchart illustrating a method for generating a plurality of customized documents according to the present invention is shown. One of ordinary skill in the art will recognize that the steps depicted in the flow chart are shown as sequential steps for convenience only. Likewise, various steps may be performed in combination, in parallel, or in a different order than that illustrated without departing from the spirit or scope of the present invention. Block 70 represents creating a first document with a first application program running on a first computing platform where the first document includes at least one space for receiving variable information. Block 72 represents transferring electronic data representing the first document to a storage medium for subsequent processing. Block 74 represents converting the electronic data to a standard image format for rendering by a print engine. In one embodiment, this step is performed by a printing machine or printer. Preferably, the electronic data is converted to a TIFF file. The data may subsequently be converted to another format, such as a bitmap format, depending upon the particular application.

Block 76 represents creating a second document with a second application program running on a second computing platform where the second computing platform is incompatible with the first computing platform. For example, the second computing platform may include a computer running a different operating system, application software, and/or both. The second document includes at least one variable positioned relative to the first document to coincide with the at least one space. The second document also includes an associated data file having data corresponding to each variable.

Block 78 of FIG. 2 represent s creating a plurality of electronic documents each having corresponding data substituted for the at least one variable. The plurality of electronic documents are typically manifested as a single mail merge file which represents an instantiation of the variables represented in the second document. Block 80 represents successively combining each of the plurality of electronic documents with the standard image format data to merge the documents. Preferably, the standard image format is rendered only once to best utilize the printing and processing resources and increase system throughput.

Figure 3:
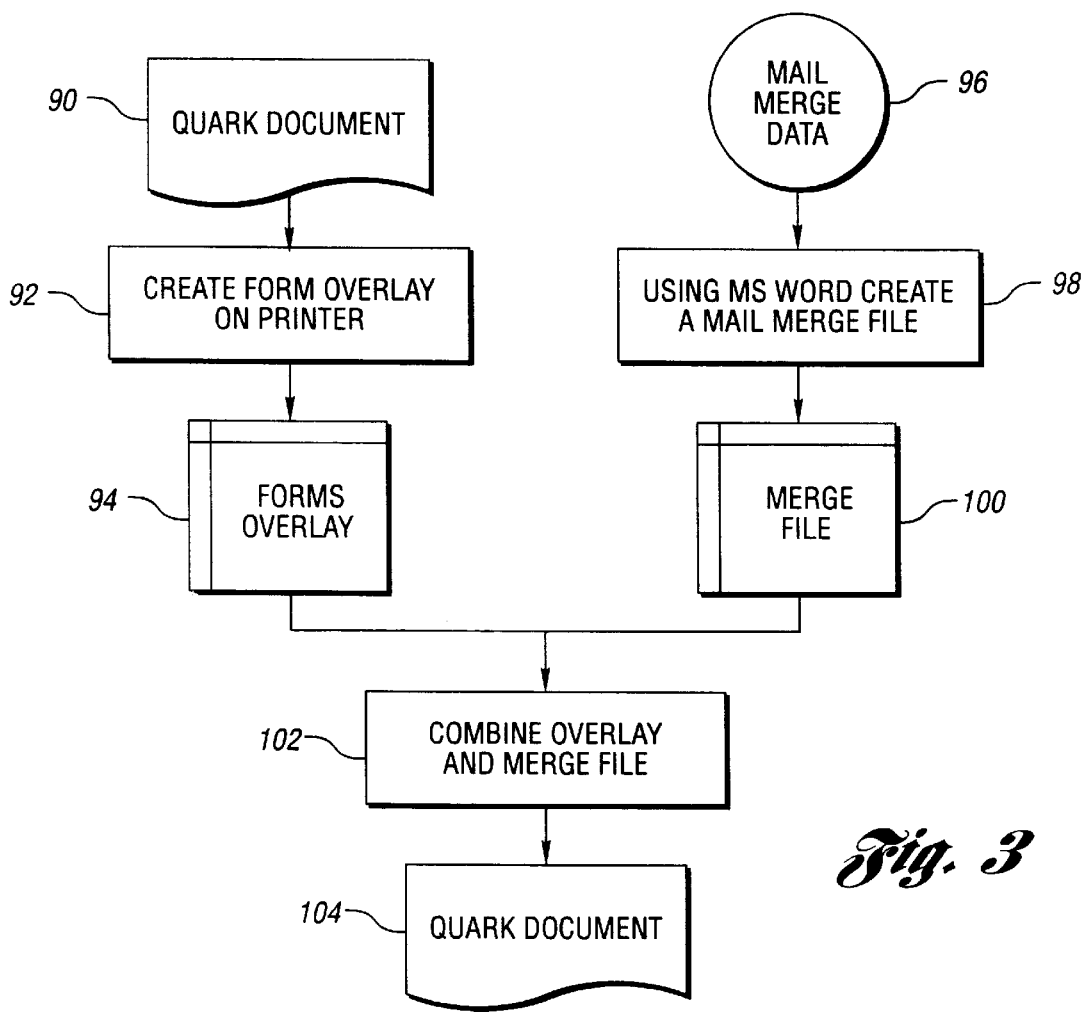
FIG. 3 is a block diagram providing an alternative representation of one preferred embodiment of a system and method for merging multi-platform documents according to the present invention.

Referring now to FIG. 3, an alternative representation of one embodiment of the present invention is shown. In this embodiment, a first document 90 is created on a Macintosh computer running MAC O/S (available from Apple Computer of Cupertino, Calif.) and an application program such as Quark Xpress or Pagemaker which includes text and/or graphics. Text may include various attributes such as a selected typeface, font size, style, and the like. Document 90 is transferred and stored on a printer either directly or indirectly. For example, document 90 may be transferred over a network, or using a removable disk. Preferably the printer is a high speed printer such as the Docutech 6135 manufactured by Xerox Corporation of Rochester, N.Y. The printer converts the Macintosh file to a standard image TIFF file and generates a form overlay as represented by block 94.

Mail merge data 96 is combined with a mail merge file 98 to produce a merge file 100. Preferably, the merge file is created using an application program such as MS Word available from Microsoft Corporation of Redmond, Wash. The mail merge document positions variables on an otherwise blank page relative to a reference point (such as a margin or page) which preferably has a corresponding reference point on the first document. The corresponding variable data from mail merge data 96 is inserted at the variable position for each document in merge file 100, i.e. the variables are instantiated. The overlay and merge files are combined as represented by block 102 to produce the complete document which is then printed by the printer as represented by block 104.

As such, the present invention provides for more accurate reproduction of a document supplied by a customer in an otherwise incompatible format to reduce turn-around time and costs associated with manually manipulating or recreating a document in the same platform used to insert the variable data. By generating an image of the first document, i.e. the document supplied by a customer, all of the attributes associated with text and graphics are preserved such that manual manipulation of these features is no longer necessary.

While the best mode contemplated for practicing the invention has been described in detail, those familiar with the art to which this invention relates will recognize various alternative designs and embodiments for practicing the invention as defined by the following claims.

What is claimed is:

1. A method for generating a plurality of customized documents having at least one portion of common information and at least one portion of variable information wherein the common information is generated using a first computing platform and the variable information is generated using a second computing platform, the method comprising:

generating data representing an electronic image by converting the common information to a TIFF file;

storing the TIFF file on an electronic storage medium associated with a printing machine;

generating a mail merge file using the second computing platform to position variables representing the variable information within a page;

electronically combining the image of the common information with the mail merge file generated using the second computing platform by overlaying the common information and variable information based on position of the variables within the page for each of the plurality of customized documents; and printing each of the customized documents.

2. The method of claim 1 further comprising converting the TIFF file to a bitmap file prior to combining the image of the common information with the mail merge file.

3. The method of claim 1 wherein the steps of generating and storing comprise generating and storing data representing an electronic image of the common information by using application software executing under a first operating system.

4. The method of claim 3 wherein the step of generating a mail merge file comprises generating a mail merge file using application software executing under a second operating system.

5. A method for merging documents created with different computing platforms, the method comprising:

creating a first document with a first application program running on a first computing platform, the first document including at least one space for receiving variable information;

transferring electronic data representing the first document to a storage medium for subsequent processing;

converting the electronic data to a standard image format for rendering by a print engine;

creating a second document with a second application program running on a second computing platform wherein the second computing platform is incompatible with the first computing platform, the second document including at least one variable positioned relative to the first document to coincide with the at least one space, and having an associated data file including data corresponding to each variable;

creating a plurality of electronic documents each having the corresponding data substituted for the at least one variable;

successively combining each of the plurality of electronic documents with the standard image format data to merge the documents.

6. The method of claim 5 wherein the first computing platform includes a microprocessor having an associated first instruction set and the second computing platform includes a microprocessor having an associated second instruction set having instructions different from the first instruction set.

7. The method of claim 5 wherein the step of converting the electronic data is performed by a printing machine.

8. The method of claim 5 wherein the step of converting the electronic data comprises converting the electronic data to a TIFF file.

9. The method of claim 8 wherein the step of converting the electronic data further comprises converting the electronic data to a bitmap format.

10. The method of claim 5 wherein the first computing platform includes an associated first operating system and wherein the second computing platform includes an associated second operating system.

11. The method of claim 5 wherein the step of creating the second document comprises selecting attributes for the at least one variable which correspond to attributes of objects surrounding the at least one space in the first document.

12. The method of claim 11 wherein the attributes include character font and size.

13. A system for creating customized documents, the system comprising:

a first computer having associated hardware and software defining a first computing platform, the first computer executing stored program instructions to create a first document containing at least one space for receiving variable information and being represented by data in a standard format;

a computer readable storage medium in communication with the first computer, the computer readable storage medium receiving and storing the data representing the first document in a standard image format;

a second computer having associated hardware and software defining a second computing platform incompatible with the first computing platform, the second computer executing stored program instructions to create a second document, the second document including at least one variable positioned relative to the first document to coincide with the at least one space and having an associated data file including data corresponding to each variable, the second computer creating a plurality of electronic documents each having the corresponding data substituted for the at least one variable; and a printer in communication with the first and second computers and the computer readable storage medium, the printer successively combining each of the plurality of electronic documents with the standard image format data to merge and print the customized documents.

14. The system of claim 13 wherein the printer contains the computer readable storage media.

15. The system of claim 13 wherein the printer comprises a microprocessor executing stored program instructions to convert the first document from the standard format to data representing an electronic image of the first document.

16. The system of claim 15 wherein the printer converts the first document to a TIFF format data file.

17. The system of claim 13 wherein the first computer runs a first operating system and the second computer runs a second operating system.

18. The system of claim 13 wherein the first computer includes a first processor having an associated first instruction set, the second computer includes a second processor having an associated second instruction set and wherein the stored program instructions executed by the first processor include at least one instruction which is not executable by the second processor.

* * * * *